United States Patent [19]

Matsui

[11] 3,988,191
[45] Oct. 26, 1976

[54] PROCESS FOR PREPARING A VESSEL FROM THERMOPLASTIC RESIN PLATE

[75] Inventor: Takashi Matsui, Nara, Japan

[73] Assignee: Sekisui Kaseihin Kogyo Kabushiki Kaisha, Japan

[22] Filed: Oct. 30, 1973

[21] Appl. No.: 411,078

[30] Foreign Application Priority Data
Nov. 7, 1972   Japan.............................. 47-111755

[52] U.S. Cl................................. 156/218; 156/69; 156/214; 156/215; 156/245; 156/304; 156/322; 264/248; 264/263; 264/321
[51] Int. Cl.².......................................... B29D 23/10
[58] Field of Search............ 156/69, 196, 212, 214, 156/215, 217, 218, 228, 242, 245, 293, 303.1, 311, 322, 304; 264/248, 259, 263, 320, 321, 268, 250, 255, 322

[56] References Cited
UNITED STATES PATENTS

| | | | |
|---|---|---|---|
| 1,406,160 | 2/1922 | Klug | 264/248 |
| 1,442,357 | 1/1923 | Patterson | 264/248 |
| 3,470,291 | 9/1969 | Johnson | 264/322 |
| 3,484,518 | 12/1969 | Ignell | 264/322 |
| 3,673,033 | 6/1972 | Mac Daniel et al. | 264/321 |
| 3,792,137 | 2/1974 | Seto | 264/321 |

*Primary Examiner*—Edward G. Whitby
*Attorney, Agent, or Firm*—Armstrong, Nikaido & Wegner

[57] ABSTRACT

A method and apparatus for forming a thermoplastic resin vessel including a bottom plate and at least two side plates is provided. The bottom plate or portion is applied to the surface of an inner mold by advancing a bottom mold carrying the bottom plate. The side plates or portions are formed along a concave surface of side molds and is then positioned around the inner mold to completely surround the inner mold to form a tube which holds the bottom plate therein. The outer mold is then removed and the vessel formed by the tube and bottom plate is then removed from the inner mold.

1 Claim, 7 Drawing Figures side plate a curved shape by pressing the side plate to the concave surface 118 of side mold 11. Heated blade 14 is used not only for cutting surplus portions of the edge of the side plate in order to give the side plate dimensions to encircle inner mold 6, but also for maintaining the cut portion in a softened state so as to be convenient for subsequent welding of the cut portion.

The process is more clearly understood by way of an apparatus which includes means for moving individual portions of the outer mold to the inner mold as schematically shown in FIG. 1. The individual portions may be moved in a predetermined order. The apparatus is shown in FIGS. 2 and 3, in which corresponding portions are indicated by the same numeral references as in FIG. 1. In the apparatus, individual portions of the outer mold are, in fact, arranged and exerted symmetrically in the right and left directions or up and down with respect to the inner mold, however, in FIGS. 2 and 3, the corresponding portions of the outer mold are shown in different positions for the sake of explaining their various operating states. The apparatus shown in FIGS. 2 and 3 is for preparing a vessel having a shape of an adverse truncated cone and comprises a circular bottom plate and two side plates of sector shape enclosing the bottom plate.

In FIGS. 2 and 3, numeral reference 1 denotes a plate which is to be a bottom plate of a vessel. Bottom plates 1 are stored in a pile with its surface standing vertically. From storage, bottom plates 1 are taken out one by one by means of circular frame 5 as shown in FIG. 4, which is located at a position where bottom mold 4 is to be advanced. Bottom mold 4 is then advanced by means of piston 7 to contact the bottom plate 1. When bottom plate 1 contacts the bottom mold 4, bottom plate 1 is firmly secured to bottom mold 4 by means of a vacuum. Bottom mold 4 is further advanced to contact the forward surface of inner mold 6. Thus, bottom plate 1 is held between bottom mold 4 and inner mold 6.

Plate 2 is a material for forming side wall of a desired vessel, and is made of thermoplastic resin, for example, foamed polystyrene. Plate 2 has the shape of a sector and dimensions which are a little larger than those obtained by vertically cutting just in half the side wall of the desired vessel. Plates 2 are stored in a horizontally piled state on board 3 and are located symmetrically on both sides of bottom plate 1 in respective definite positions by means of locating means 8. While plates 2 are in contact with the respective locating means, plates 2 are heated by heating means which are not shown. Then, plates 2 are conveyed to side molds 11 by movement of respective transferring means 9.

Two convex molds 12 are movably arranged above side plate 11 positioned on guide 15 symmetrically on both sides of inner mold 6 and each of the convex molds 12 has a convex surface just corresponding to the concave surface 118 of side mold 11 leaving a small gap therebetween. If convex mold 12 is lowered to match with side mold 11, that is, lowered from position 12 shown in the right part of FIG. 3 to the corresponding position 12' shown in the left part of FIG. 3, then side plate 2 placed on side mold 11 is bent to have a curvature just corresponding to the concave surface 118. Heated blade 14 is then moved by means of piston 10 until blade 14 contacts convex mold 12', thus the surplus portion of side plate 2 is cut away and the cut portion is heated and softened. Thereafter heated blade 14 is returned, and convex mold 12 is raised and removed from side mold 11. At that time, curved plate 2, is fixed to side mold 11 by means of vacuum action. Thereafter, side mold 11 is transferred to inner mold 6 by means of piston 16.

Since side mold 11 is pivoted on rod 112 about axis 111, and is supported by guide 15, side mold 11 can be moved to inner mold 6 along the upper side of guide 15 by means of rod 112, and as the result side mold 11 is rotated around axis 111 on the slant corner of guide 15, and then side mold 11 is brought into the position where concave surface 113 faces to inner mold 6. Since side mold 11 carries side plate 2, side mold 11 presses side plate 2 to the inner mold 6. As already stated, side molds 11 are arranged on both sides of inner mold 6 and pushed symmetrically, therefore, inner mold 6 is surrounded by two side plates 2, each of which is pressed by respective side molds 11. At this stage, gaps exist between both side molds 11 and the gaps are situated on abutted edges of both side plates 2.

Thereafter remaining side molds 17 are inserted into the above gaps, and thus the outer molds completely surround inner mold 6, and the abutted edges of both side plates 2 are pressed to inner mold 6. At this point, the edges are heated and are in a softened state, therefore the abutted edges are welded together by pressure of the remaining side molds 17. As the result, both side plates 2 are formed into a truncated conical plate around inner mold 6. At the same time, bottom plate 1 is surrounded by the conical plate and thrust into the conical plate. Consequently, a vessel having the shape of an adverse truncated cone is formed by the bottom and side plates.

After the vessel has been formed, remaining side molds 17 are at first returned to their initial positon, then side molds 11 are returned. At this point, side molds 11 are returned along guide 15, and at last side molds 11 take the original position wherein respective concave surfaces 118 of the side molds 11 faces upwards. During or after the return of side molds 11, bottom mold 4 is returned. Since bottom plate 1 is sucked to bottom mold 4 by vacuum action, and inner mold 6 has the shape of a trunacted cone, the formed vessel is easily removed from inner mold 6 as bottom mold 4 is returned to its initial position. Thereafter, when vacuum is stopped in bottom mold 4, the formed vessel falls from bottom mold 4.

Bottom plate 1 is easily taken out one by one from a number of the plates stored in contact with each other through a device as shown in FIG. 4. FIG. 4 shows a number of bottom plates 1 are stacked and are always kept in close contact with plate 52, by pressing plate 51 to plate 52. Frame 5 has a cut portion only sufficient to hold therein a sheet of bottom plate 1. and can reciprocate in the directions indicated by arrow. When frame 5 has been brought into the position wherein the cut portion of frame 5 is congruent with bottom plate 1, frame 5 can receive only one bottom plate 1, and with the subsequent movement frame 5 takes out one bottom plate 1 from the stack. When frame 5 carrying bottom plate 1 is brought to a position as shown in FIG. 4 and FIG. 5, bottom mold 4 is advanced and contacts bottom plate 1 held in frame 5. Bottom mold 4 is provided with a suction hold 41 which is communicated with a vacuum pipe, thus bottom plate 1 is sucked to bottom mold 4. When bottom mold 4 is further advanced to inner mold 6, bottom plate 1 is advanced along with the advancement of bottom mold 4 until bottom plate 1 is caught between inner mold 6 and bottom mold 4. Thereafter frame 5 is returned. When

PROCESS FOR PREPARING A VESSEL FROM THERMOPLASTIC RESIN PLATE

BACKGROUND OF THE INVENTION

A method such as injection molding or compression molding has hereto been used for preparing a vessel from a thermoplastic resin. This method, however, is not suited for preparation of a vessel which is, for example, made of a highly foamed resin. This is because, in this method, the resin is so strongly compressed in the mold that the resin is prevented from high foaming. Therefore the injection molding method can not make a highly foamed article. As a result, in order to obtain a vessel of a highly foamed thermoplastic resin, a method must be adopted in which a highly foamed resin sheet is at first prepared and then the sheet is fabricated into a vessel. However, there has not been hitherto an efficient method for preparing a vessel by using a highly foamed resin sheet as the material. The present invention has been made in view of the above fact.

SUMMARY OF THE INVENTION

The characteristics of this invention are briefly explained as follows: there are used as materials a bottom sheet or plate or portion and two side sheets or plates or portions of hard thermoplastic resin. Hereinafter sheet and plate are simply referred to as plate or portion. A mold is used which includes an inner mold and outer mold, the inner mold has, for example, the shape of a truncated cone and dimensions which correspond to inner dimensions of a desired vessel. The outer mold is constructed with a bottom mold and side mold, the side mold being further separated into a plurality of portions. The bottom mold and the portions of the side mold are designed to be movable and to surround said inner mold. In more particular, the bottom mold can cover the forward surface of the inner mold, and the portion of the side mold can cover the conical surface of said mold. The inner mold normally comprises one body which is unmovably secured to a certain fixed place. On the forward surface of the inner mold is applied the bottom plate which is carried by the bottom mold. Each of said side plates is carried by one of the portions of the side mold and is applied to the conical surface of the inner mold. The side plates are previously bent so as to be closely contacted with the conical surface. Both edges of each of said side plates are heated and kept in a softened state. The edges are allowed to abutt around the inner mold and to weld each other. In the case wherein the side mold is constructed with four portions, the edges which are kept in a softened state should be held so as to protrude from the portions of the side mold carrying the side plate, and the edges are not contacted with any of the portions of the side mold until the remaining portions of the side mold which do not carry the side plates are moved and applied to the side plate. Thus the edges are pressed by the remaining portions and welded to each other. According to the present invention there is provided a process and apparatus for preparing a vessel from thermoplastic resin plate which comprises employing as materials a bottom plate and at least two side plates of hard thermoplastic resin. An inner mold having the shape of a pillar and an outer mold which comprises a bottom mold and side mold are used. The side mold includes a plurality of separate portions all of which are movable to surround said inner mold. First the bottom mold and portions of the side mold are placed away from said inner mold, then the bottom mold accompanied by the bottom plate is moved and the bottom plate is applied to a forward end of the inner mold. Each side plate is bent along concave surface of one of said portions to form a curved plate, maintaining both edges of each of the side plates in a softened state. Thereafter the portions are moved together with the curved plates to surround the inner mold and the softened edges are welded together to complete around the inner mold a tube which holds the bottom plate therein. The outer mold and inner mold are then removed to obtain the vessel.

BRIEF DESCRIPTION OF THE DRAWINGS

The present invention will be explained with reference to the accompanying drawings wherein an example of an apparatus is shown, in which:

FIG. 4 is a perspective view of a means for taking out bottom plates one by one.

FIG. 5 is a horizontal sectional view of a means for applying a bottom plate to a forward end of an inner mold.

FIG. 6 is a perspective view of a means for bending a side plate, cutting both side peripheries of the side plates, and removing cut portions of the side plate.

FIG. 7 is a perspective view of an improved side mold which can be easily extended or contracted in the axial direction.

DESCRIPTION OF THE PREFERRED EMBODIMENT

Figure 1:
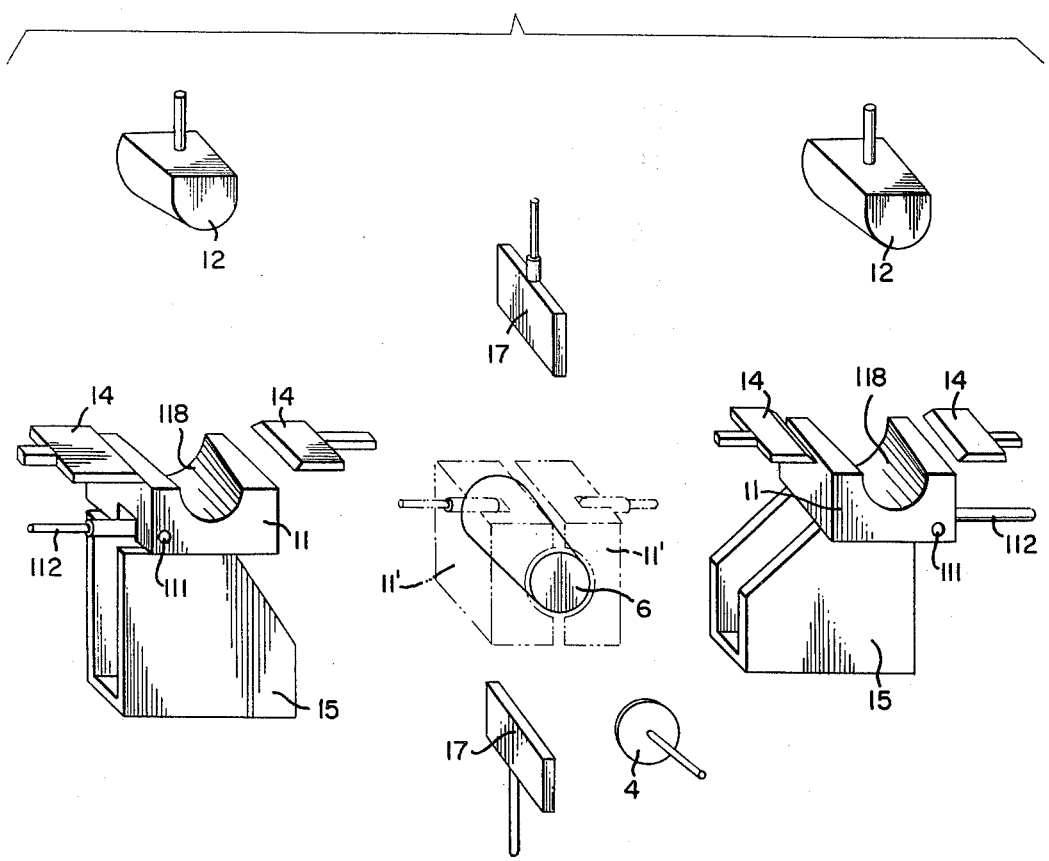
FIG. 1 is a perspective view schematically showing the invented process.

Referring now to the drawings, a principle of the invented process and apparatus is explained as follows: In FIG. 1, inner mold 6 is immovably secured. Bottom mold 4 carries a bottom plate or portion and moves toward inner mold 6. Side mold 11 carries a side plate or portion of thermoplastic resin and moves toward inner mold 6. Side mold 11 is pivoted by pin 111 on rod 112, and moves on guide 15. Thus, side mold 11 is placed with its concave surface facing upward, when side mold 11 is furthest away from inner mold 6, however, side mold 11 is placed with its concave surface facing to inner mold 6 and covers the conical surface of mold 6, when side mold 11 is closest to inner mold 6. A portion 17 of outer mold is inserted between two side molds 11, after side molds 11 have surrounded inner mold 6, thus portion 17 presses to inner mold 6 the edges of the side plates of thermoplastic resin which are to be adhered to each other. In short, bottom mold 4 carrying a bottom plate first contacts inner mold 6, side mold 17 carrying a side plate then contacts inner mold 6, and last side mold 17 contacts inner mold 6, thus a vessel is prepared. This is the principle of the process of the present invention.

Figure 4:
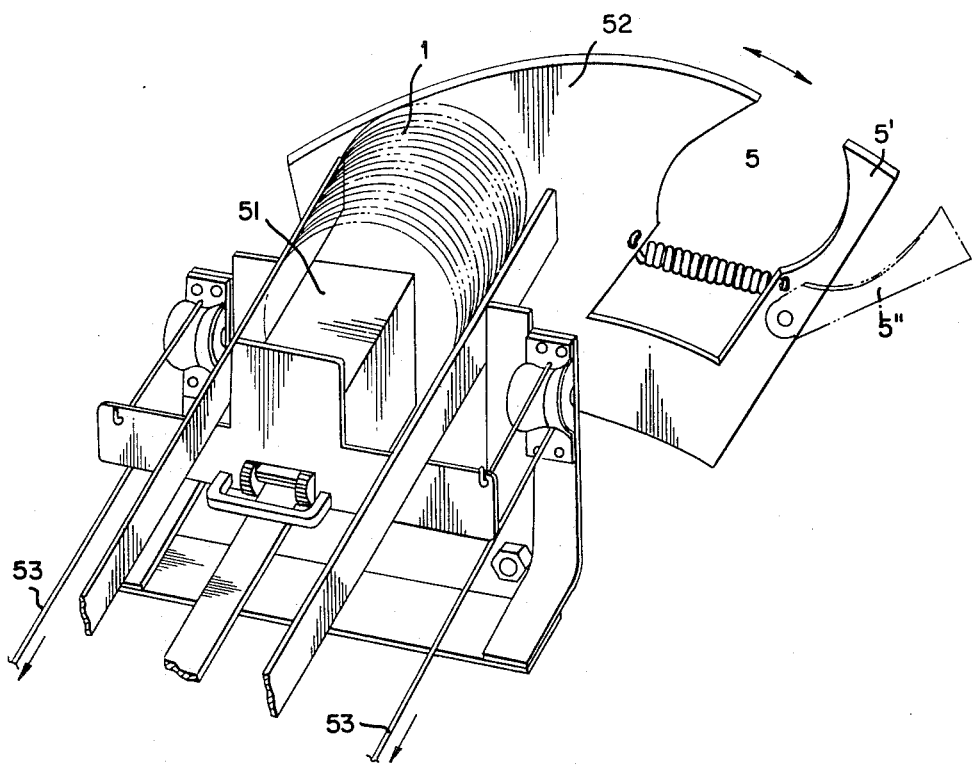
Figure 5:
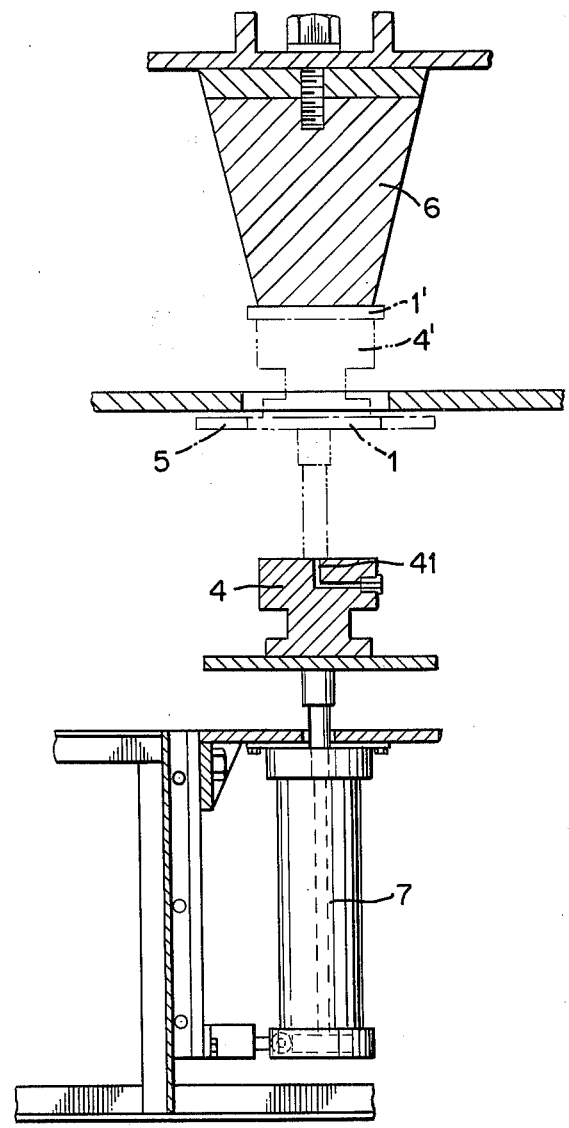

Convex mold 12 is easily allowed to advance to or recede from side mold 11, when side mold 11 is placed on guide 15 with the concave surface 118 facing upward. Thus, if a heated side plate of thermoplastic resin is placed on side mold 11, convex mold 12 gives the frame 5 is to be returned, movable portion 5' plays an important roll. Movable portion 5' is pivoted on the frame 5 proper, and can not be further moved inwardly, only outward. Moreover, movable portion 5' is always inwardly pulled by a coil spring. Thus, movable portion 5 can hold bottom plate 1, and if needed, movable portion 5' can be moved to a position 5' as shown by the chain line in FIG. 4. Therefore, if a rod extends through the cut portion in frame 5, and the rod should be removed from the cut portion, then the rod can be easily removed by both return movement of frame 5 and outward movement of movable portion 5'. Thus, a rod supporting bottom mold 4 can be easily removed from frame 5, and as the result, bottom plate 1 is maintained only by bottom mold 4 and inner mold 6.

Figure 6:
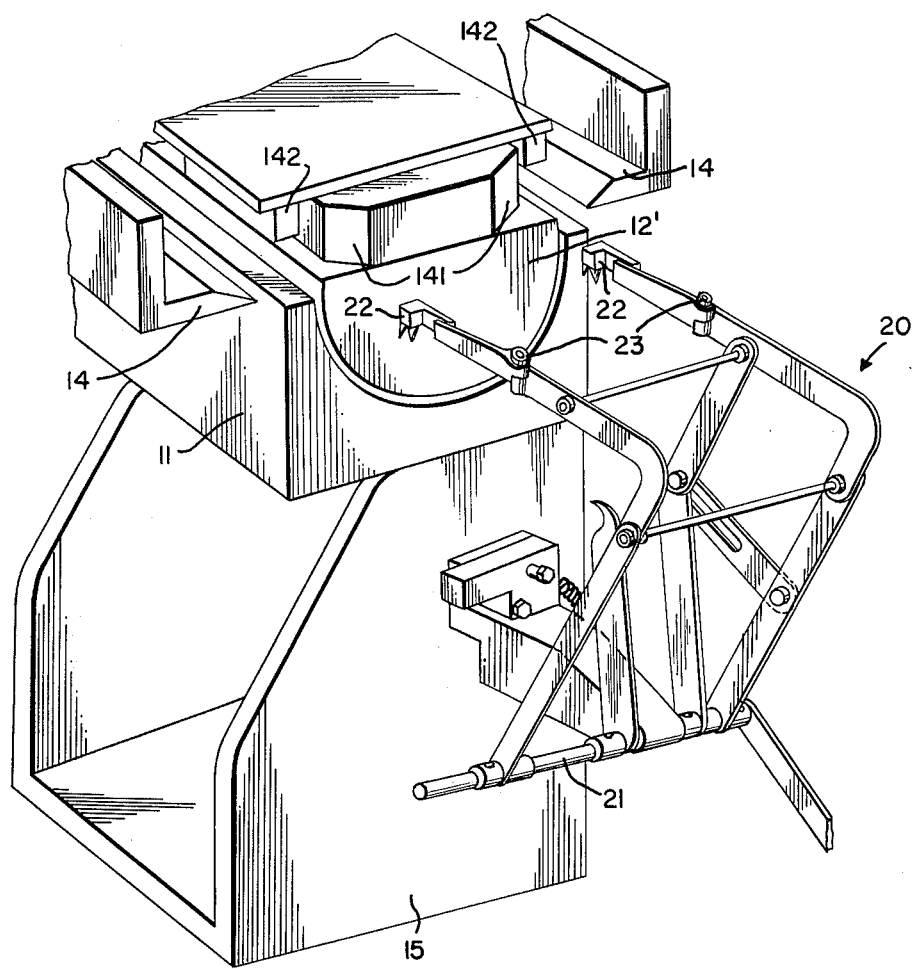

Surplus portions of the side plates are cut away in the following manner: in FIG. 6, when the side plate is held between side mold 11 and convex mold 12', and is in the curved state, heated blade 14 is advanced toward convex mold 12', and cuts the protruding portion of the side plate at the position which is a little upward from upper end of side mold 11. Thereafter, removing means 20 is rotated around axis 21, and forward end 22 is contacted with the cut portion of the sideplate. In particular, since forward end 22 is pivoted at 23 on removing means 20, forward end 22 is at first touched by guide 141 then moved along guide 141 and pushed outward, thus the distance between both forward ends is at first increased. Thereafter, forward end 22 is moved along guide 142, and pushed inward, thus the distance between both forward ends is decreased accordingly as removing means 20 is rotated around axis 21. As the result, forward end 22 is surely contacted with the protruding portion of the side plate. Since the protruding portion, cut by heated blade 14 is heated and in a softened state, when the forward end 22 contacts the above portion, a hook on forward end 22 thrusts into the portion, thus the protruding portion is adhered to forward end 22. Therefore, when removing means 20 is rotated to its original position, the cut portion is adhered to and removed by removing means 20.

Figure 7:
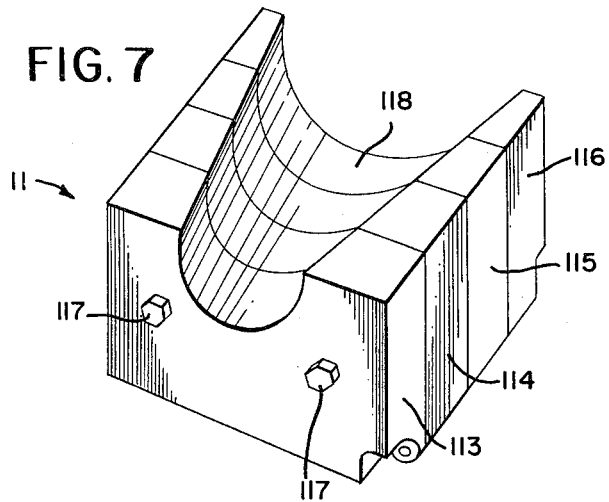
FIGS. 4 through 7 are enlarged views of a portion of the apparatus shown in FIGS. 2 and 3, in particular.
Figure 2:
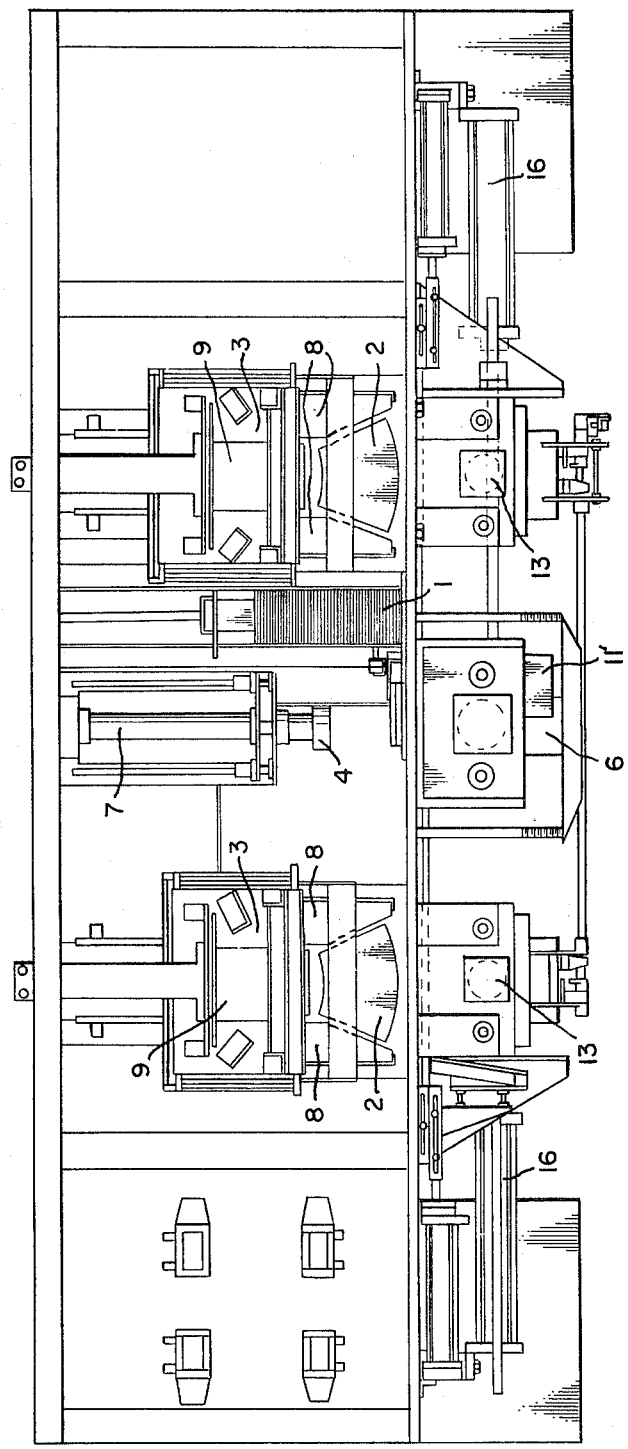
FIGS. 2 and 3 are respectively a plan view and a front view of an apparatus manufactured for the purpose of carrying out the process.
Figure 3:
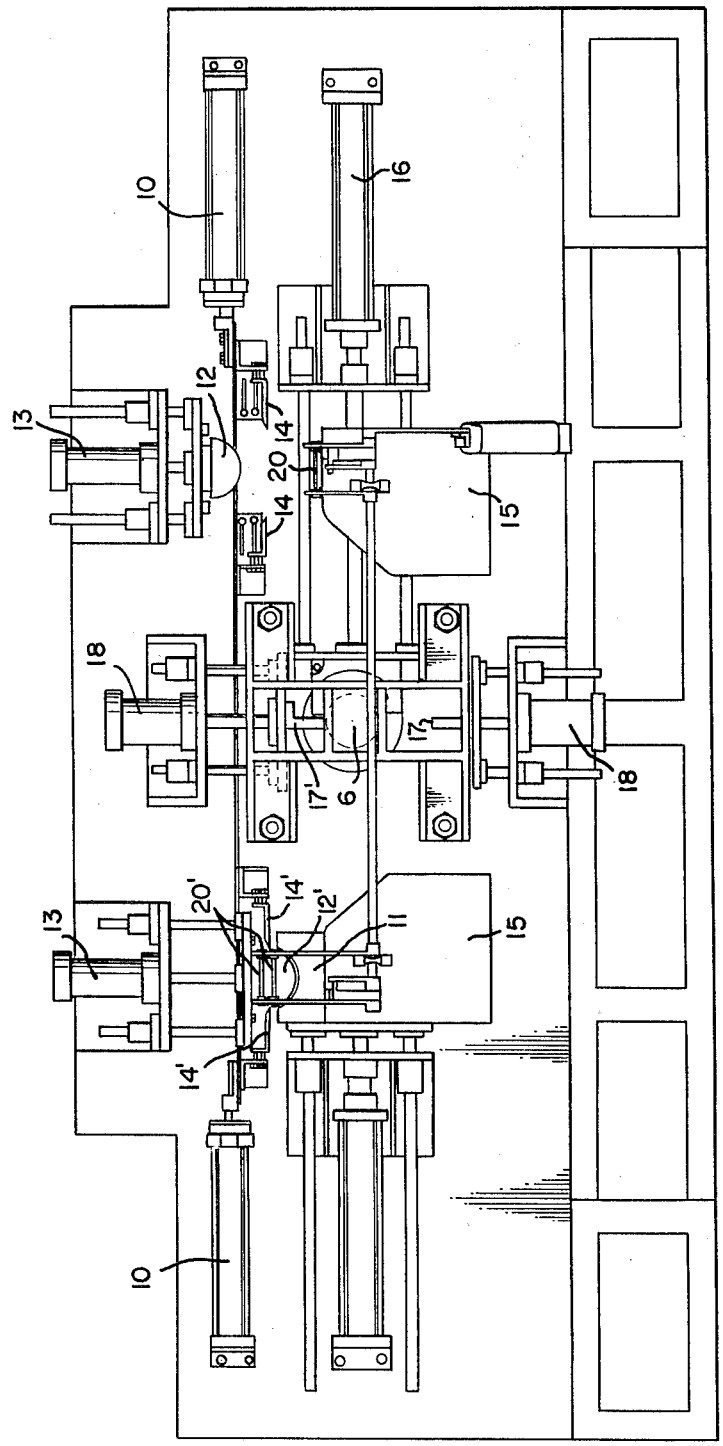

FIG. 7 shows an embodiment side mold 11. In general, it is preferable that the vessel prepared by this process has such a taper towards the bottom of the vessel, in order to prevent the bottom plate from slipping out owing to the pressure exerted by the substance contained therein. By this reason, side mold 11 is provided with a tapered concave surface 118 having the shape of a half of a truncated cone. In such a case, it is preferable that side mold 11 comprise elements 113, 114, 115, 116, and so on, as shown in FIG. 7, all of which are prepared by cutting the side mold along a number of planes perpendicular to the axis of conical concave surface 118. It is because, side mold 11 can be easily composed by choosing an appropriate combination of the elements to have the concave surface of a desired diameter. Bolts 117 may be used for combining the elements. The explanation is made with reference to the side mold, however, the case is almost the same with inner mold 6 and convex mold 12.

Bottom plate 1 does not need to be made of thermoplastic resin, but may be made of thermosetting resin, wood, metal or paper board. However, side plate 2 should be made of thermoplastic resin. It is in the case wherein the foamed thermoplastic resin plate such as foamed polystyrene plate is used for side plate 2 that the invented process shows the most conspicuous effect.

According to the process, the vessel having the shape of a pillar, especially a truncated cone, can be automatically and continuously prepared from the thermoplastic resin plate. Therefore, the vessel can be prepared at a moderate price and with good efficiency. Further, the vessel maintains good characteristics such as highly foamed resin, patterns and colours which have been imparted to the side plate of thermoplastic resin plate. Consequently, the vessel is of good quality. Especially, when a foamed polystyrene plate is used for the material, the vessel becomes best suited for a vessel for food stuffs, because the vessel has a good heat insulating property as well as high impact strength. Therefore, the process is very useful for preparation of a vessel having the shape of a truncated cone.

To the above apparatus is added reamining side mold 17, which presses abutted portion of two side plates to the inner mold, in order to completely weld the abutted portion and also to leave no noticeable trace of the abutted portion. However, remaining side mold 17 is not needed, unless the side plate has the property that it decreases its dimensions when heated, as for example in a foamed polystyrene sheet. Further, it is not necessary to use heated blade 14 in order to cut the surplus portion of the sideplate after the side plate has been bent on side mold 11, unless the side plate decreases its dimensions when heated. Therefore, when an unfoamed thermoplastic plate is used for the side plate, remaining side mold 17 and heated blade 14 may be omitted, and also in this case the vessel can be prepared at moderate price and with good efficiency. Consequently, this process is very useful.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than the foregoing description, and all changes which come within the meaning and range of equivalency of the claims are therefore intended to be embraced therein.

I claim:

1. A process for preparing a thermoplastic resin vessel having a bottom portion and at least two side portions of hard thermoplastic resin, positioning a bottom mold and the major and remaining portions of a side mold away from an inner mold, placing the bottom portion on the bottom mold, bending each of said side portions along a concave surface of one of the major mold portions to form a curved portion, maintaining both edges of each of said curved portions in a softened state, applying the bottom portion to a forward surface of the inner mold by advancing the bottom mold carrying the bottom portion, moving the major mold portions carrying said curved portions to surround the inner mold, then inserting remaining mold portions of the side mold between said major mold portions around the inner mold, thus simultaneously adhering each of said softened edges to completely surround the inner mold to form a tube which holds the bottom portion therein, and removing the bottom mold and major portions and remaining portions of the side mold and the inner mold to obtain the vessel.

* * * * *